United States Patent [19]
Huh

[11] Patent Number: 6,021,168
[45] Date of Patent: Feb. 1, 2000

[54] CLOCK RECOVERY CIRCUIT AND METHOD FOR MPEG-2 SYSTEM DECODER

[75] Inventor: Jun-Ho Huh, Yongin, Rep. of Korea

[73] Assignee: Samsung Electronics Co., Ltd., Kyungki-do, Rep. of Korea

[21] Appl. No.: 08/964,569

[22] Filed: Nov. 5, 1997

[30] Foreign Application Priority Data

Nov. 6, 1996 [KR] Rep. of Korea ........................ 96-52399

[51] Int. Cl.[7] ...................................................... H03D 3/24
[52] U.S. Cl. ........................... 375/376; 375/371; 375/364; 370/468; 370/395
[58] Field of Search ................................... 375/376, 371, 375/364; 370/395, 468

[56] References Cited

U.S. PATENT DOCUMENTS

| | | | |
|---|---|---|---|
| 5,699,392 | 12/1997 | Dokic ........................................ | 375/376 |
| 5,768,326 | 6/1998 | Koshiro et al. ........................... | 375/376 |
| 5,790,543 | 8/1998 | Cloutier .................................... | 370/395 |
| 5,881,114 | 3/1999 | Moon ........................................ | 375/376 |

*Primary Examiner*—Stephen Chin
*Assistant Examiner*—Shuwang Liu

*Attorney, Agent, or Firm*—Skjerven, Morrill, MacPherson, Franklin & Friel LLP; David T. Millers

[57] ABSTRACT

A clock recovery circuit and method for an MPEG-2 system decoder. The clock recovery circuit comprises a digital signal processor including a controller, a PCR/SCR detector, an adder/subtracter unit, a digital filter and a register, a DAC, a low pass filter, a voltage controlled oscillator and a counter. The counter generates a clock value of a desired number of bits. The PCR/SCR detector receives a transport or program stream and detects a PCR or SCR therefrom. The controller checks whether the detected PCR or SCR is an initial value. If the detected PCR or SCR is the initial value, the adder/subtracter unit subtracts the clock value from the counter from the detected PCR or SCR starting from the least significant bit to generate a first value. If the detected PCR or SCR is not the initial value, the adder/subtracter unit subtracts lower-order bit values of the first value corresponding to the desired number from lower-order bit values of the detected PCR or SCR corresponding to the desired number and subtracts the clock value from the counter from the subtracted result to generate a second value. Then, the adder/subtracter unit transfers the second value to the DAC. Also, the adder/subtracter unit adds the clock value from the counter to the first value starting from the least significant bit to generate a system time clock.

13 Claims, 4 Drawing Sheets

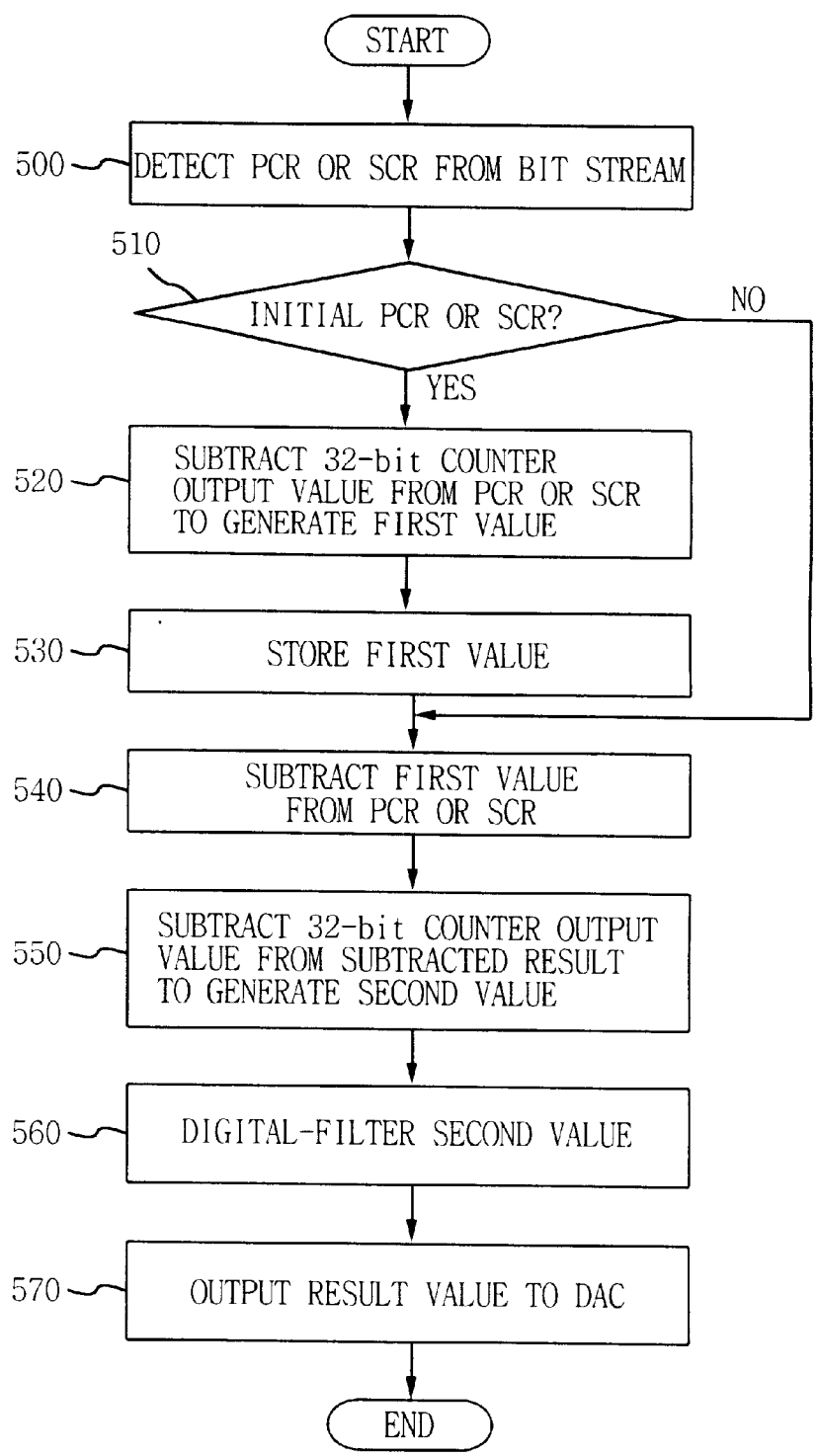

CLOCK RECOVERY CIRCUIT AND METHOD FOR MPEG-2 SYSTEM DECODER

BACKGROUND OF THE INVENTION

1. Field of the Invention

The present invention relates in general to an MPEG-2 system decoder, and more particularly to a clock recovery circuit and method for the MPEG-2 system decoder.

2. Description of the Prior Art

An MPEG-2 system decoder divides into two kinds that is, a program system decoder for separating audio and video data from a program stream of storing means, for example a CD ROM, and a transport stream decoder for separating audio and video data from a transport stream of a broadcasting signal.

An MPEG-2 system encoder encodes audio and video data, respectively, and packetizes the encoded audio and video data. Then, the MPEG-2 system encoder multiplexes the packetized data into a program stream or a transport stream to be transmitted.

FIGS. 1a and 1b are views illustrating data formats of the program and transport streams, respectively. As shown in FIG. 1a, the transport stream is composed of an audio or video packet which has a packet header at its head portion. As shown in FIG. 1b, the program stream is composed of a pack which includes a plurality of audio and video packets and has a pack header at its head portion (see ISO/IEC 13818-1, Annex F).

The packet header of the transport stream includes a program clock reference (PCR), and the pack header of the program stream includes a system clock reference (SCR). The PCR and SCR are information for correcting a system clock frequency, which is a time reference of an MPEG-2 system decoder, into a value intended by the encoder.

FIG. 2 is a detailed diagram of the data format of the transport stream in FIG. 1a. As shown in this drawing, each transport stream packet has a capacity of 188 bytes and consists of two parts a packet header and a payload. The packet header consists of a packet header part of 4 bytes and a variable length adaptation field part. The variable length adaptation field part includes a PCR of 48 bits and various other information. The PCR includes a PCR base part of 33 bits, a reserved part of 6 bits and a PCR extension part of 9 bits. Disregarding reserved bits, the PCR is 42 bits-long (see ISO/IEC 13818-1, Table 2-b).

Although not shown, the pack header of the program stream includes an SCR which is composed of 42 bits in the MPEG-2 system (see ISP/IEC 13818-1, Annex F.0.7).

The reason why the PCR and SCR are composed of 42 bits, respectively, is for representing the range of 24 hours at 27 MHz. Namely, the 9-bit PCR extension part is used to count from 0 to 299 repeatedly at 27 MHz, and the 33-bit PCR base part is used to count by one whenever the counting operation is performed from 0 to 299 at the 9-bit PCR extension part. In this manner, the range of 24 hours can be represented at 27 MHz. In this case, the 33-bit PCR base part has a value counted at 90 KHz.

As mentioned above, the PCR and SCR are used to correct the STC, which is the time reference of the MPEG-2 system decoder, into a value intended by the encoder. The MPEG-2 system decoder comprises a phase locked loop (PLL) for the synchronization with the PCR and SCR (see ISO/IEC 13818-1. Annex D.0.3 for MPEG-2 recovery method). The use of the PLL allows the STC to be in perfect accord with a system clock of the encoder in frequency. The system clock of the encoder is 27 MHz in the MPEG-2 system, and the STC of the decoder is compared with a decoding time stamp (DTS) and a presentation time stamp (PTS) so that audio and video frames can be decoded and reproduced accurately at times determined by the encoder. Namely, the PTS is information for the control of a reproducing time and the DTS is information for the control of a decoding time. The PTS and PCR/SCR base parts are used to represent a value counted at 90 KHz as a 33-bit length. The reason why the frequency is 90 KHz is that it is a common multiple of video frame frequencies in NTSC and PAL systems and for obtaining a precision degree higher than that of an audio sample period (44.1 KHz).

Conventionally, upon receiving the transport or program stream from the encoder, the decoder detects the PCR or SCR therefrom for the clock synchronization. Then, the decoder sets the first PCR or SCR as the STC and performs a phase locked operation so that a system clock of the decoder can be in accord with the system clock of the encoder. In the MPEG-2 system decoder, an apparatus for performing the phase locked operation to restore the system clock of the decoder to the system clock of the encoder is called a clock recovery circuit (ISO/IEC 13818-1. FIG. D-2).

A conventional clock recovery circuit for the MPEG-2 system decoder must employ a 42-bit counter for generating a 42-bit STC for the comparison with the 42-bit PCR or SCR. For this reason, a data access time becomes longer in the case where a 16-bit or 32-bit digital signal processor is used for the clock recovery. For example, in the case where the 32-bit digital signal processor is used to access 42-bit data, it has to perform the data access operation twice. That is, since the 32-bit digital signal processor consists of 32-bit ALU, it is necessary more dummy cycles to access 42-bit data. This causes the processor to deteriorate its processing effects although the processor must perform a demultiplexing operation of bitstream being continuously received at high speed. The conventional clock recovery circuit has a further disadvantage that, if the first PCR or SCR is received upon power-on or channel change, it should be set in the 42-bit counter.

However, considering the fact that an input period of the PCR is 0.1 sec and an input period of the SCR is 0.7 sec, there is no necessity for comparing all of the 42 bits of the PCR or SCR with the 42 bits of the STC. In other words, the 42-bit counter is not necessary.

FIG. 3 is a block diagram of a conventional clock recovery circuit for MPEG-2 system decoder. As shown in this drawing, the conventional clock recovery circuit comprises a digital signal processor 300 including a controller 310, a PCR/SCR detector 320, an adder/subtracter unit 330 and a digital filter 340, a digital/analog converter (DAC) 350, a low pass filter 360, a voltage controlled oscillator 370 and a 42-bit counter 380. In FIG. 3, a digital signal processor included generally in the MPEG-2 system decoder is shown to be used for the clock recovery.

Upon receiving a transport or program stream, the PCR/SCR detector 320 detects a 42-bit PCR or SCR therefrom. The controller 310 receives the PCR or SCR detected by the PCR/SCR detector 320 and then checks whether the received PCR or SCR is an initial value. If the received PCR or SCR is the initial value, the controller 310 transfers the received PCR or SCR to the 42-bit counter 380 to set it in the 42-bit counter 380. However, in the case where the received PCR or SCR is not the initial value, the controller 310 transfers the received PCR or SCR to the adder/ subtracter unit 330 which then subtracts an STC, which is an output value from the 42-bit counter 380, from the transferred PCR or SCR. The digital filter 340 digital-filters an output value from the adder/subtracter unit 330 to generate a 16-bit digital value. The DAC 350 converts the digital value from the digital filter 340 into an analog value. The low pass filter 360 low pass filters the analog value from the DAC 350. The voltage controlled oscillator 370 generates a system clock reference which is varied in frequency according to an output value from the low pass filter 360. Namely, in the case where the output value from the adder/subtracter unit 330 is positive, it is signified that the system clock is low in frequency. In this case, the voltage controlled oscillator 370 generates the system clock at a higher frequency. However, in the case where the output value from the adder/subtracter unit 330 is negative, it is signified that the system clock is high in frequency. In this case, the voltage controlled oscillator 370 generates the system clock at a lower frequency. On the other hand, after being set to the initial PCR or SCR, the 42-bit counter 380 performs a counting operation in response to the system clock from the voltage controlled oscillator 370. Differently from the general counting operation, the 42-bit counter 380 generates the lower-order 9 bits by repeatedly counting from 0 to 299 and the higher-order 33 bits by counting by one whenever counting from 0 to 299,. Then, the 42-bit counter 380 outputs the counted value to the adder/subtracter unit 330.

However, in the above-mentioned conventional clock recovery circuit for the MPEG-2 system decoder, if the PCR or SCR of the transport or program stream is the initial value, it must be set in the 42-bit counter. Also, the 42-bit counter is used to generate the 42-bit STC for the comparison with the 42-bit PCR or SCR. For this reason, a data access time becomes longer in the case where a 16 bit or 32-bit digital signal processor is used to access 42-bit data. For example, in the case where the 32-bit digital signal processor is used to access 32-bit data, it performs the data access operation only once. However when the 32-bit digital signal processor accesses 42-bit data, it has to perform the data access operation twice. However, considering input periods of the PCR and SCR, there is no necessity for comparing all of the 42 bits of the PCR or SCR with the 42 bits of the STC.

In result, the above-mentioned conventional clock recovery circuit is disadvantageous in that the data access time becomes longer in the case where the 16-bit or 32-bit digital signal processor is used to access 42-bit data, and the STC must be changed to the initial PCR or SCR whenever the initial PCR or SCR is received.

SUMMARY OF THE INVENTION

Therefore, the present invention has been made in view of the above problems, and it is an object of the present invention to provide a clock recovery circuit for an MPEG-2 system decoder in which a counter is reduced in size so that a data access time and processing time of a digital signal processor can be reduced, and there is no necessity for setting a first PCR or SCR in the counter.

It is another object of the present invention to provide a clock recovery method for an MPEG-2 system decoder in which the number of PCR or SCR bits to be compared with an STC is reduced, and there is no necessity for changing the STC to a first PCR or SCR in system initialization.

In accordance with one aspect of the present invention, there is provided a clock recovery circuit for an MPEG-2 system decoder, comprising a digital signal processor including program clock reference (PCR)/system clock reference (SCR) detection means for receiving a transport or program stream and detecting a PCR or SCR from the received transport or program stream; addition/subtraction means for, if the PCR or SCR detected by the PCR/SCR detection means is an initial value, subtracting a clock value of a desired number of bits from the detected PCR or SCR starting from the least significant bit to generate a first value and, if the detected PCR or SCR is not the initial value, subtracting lower-order bit values of the first value corresponding to the desired number from lower-order bit values of the detected PCR or SCR corresponding to the desired number, subtracting the clock value from the subtracted result to generate a second value and adding the clock value to the first value starting from the least significant bit to generate a system time clock; storage means for storing the first value from the addition/subtraction means therein; and control means for checking whether the PCR or SCR detected by the PCR/SCR detection means is the initial value and controlling operations of the means in accordance with the checked result; digital/analog conversion means for converting the second value from the addition/subtraction means into an analog value; filtering means for filtering an output value from the digital/analog conversion means; a voltage controlled oscillator for generating a system clock which is varied in frequency according to an output value from the filtering means; and counting means for generating the clock value of the desired number of bits in response to the system clock from the voltage controlled oscillator in such a manner that it generates lower-order 9 bits of the clock value by repeatedly counting a desired range and the remaining higher-order bits of the clock value by counting by one whenever counting the desired range.

In accordance with another aspect of the present invention, there is provided a clock recovery method for an MPEG-2 system decoder, the decoder having digital/analog conversion means for converting an input digital signal into an analog signal, filtering means for filtering the analog signal from the digital/analog conversion means, a voltage controlled oscillator for generating a system clock which is varied in frequency according to an output signal from the filtering means, and counting means for generating a clock value of a desired number of bits in response to the system clock from the voltage controlled oscillator in such a manner that it generates lower-order 9 bits of the clock value by repeatedly counting a desired range and the remaining higher-order bits of the clock value by counting by one whenever counting the desired range, the method comprising the first step of receiving a transport or program stream, detecting a program clock reference (PCR) or system clock reference (SCR) from the received transport or program stream and checking whether the detected PCR or SCR is an initial value; the second step of, if the detected PCR or SCR is the initial value, subtracting the clock value from the counting means from the detected PCR or SCR starting from the least significant bit to generate a first value; the third step of, if the detected PCR or SCR is not the initial value, subtracting lower-order bit values of the first value corresponding to the desired number from lower-order bit values of the detected PCR or SCR corresponding to the desired number, subtracting the clock value from the counting means from the subtracted result to generate a second value and transferring the second value to the digital/analog conversion means; and the fourth step of adding the clock value from the counting means to the first value starting from the least significant bit to generate a system time clock.

BRIEF DESCRIPTION OF THE DRAWINGS

The above and other objects, features and advantages of the present invention will be more clearly understood from the following detailed description taken in conjunction with the accompanying drawings, in which:

FIG. 2 is a detailed diagram of the data format of the transport stream in FIG. 1a;

FIG. 5 is a flowchart illustrating the operation of a digital signal processor in FIG. 4 in accordance with an embodiment of the present invention.

DETAILED DESCRIPTION OF THE PREFERRED EMBODIMENTS

Figure 1A:
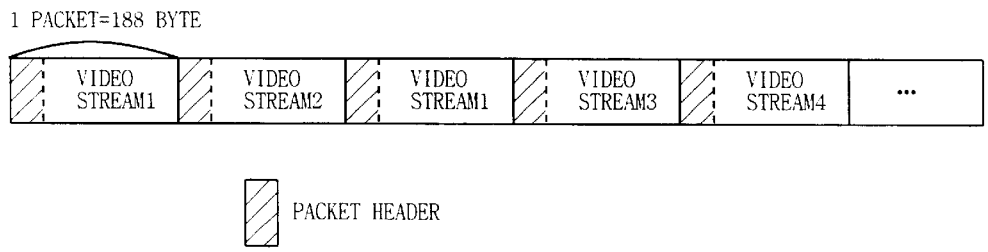
FIGS. 1a and 1b are views illustrating data formats of transport and program streams, respectively.
Figure 1B:
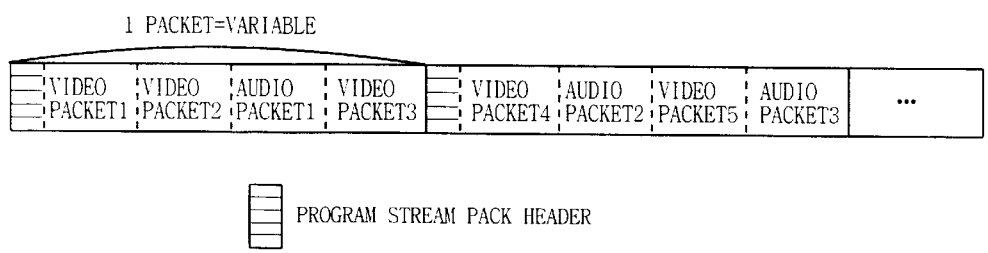
Figure 2:
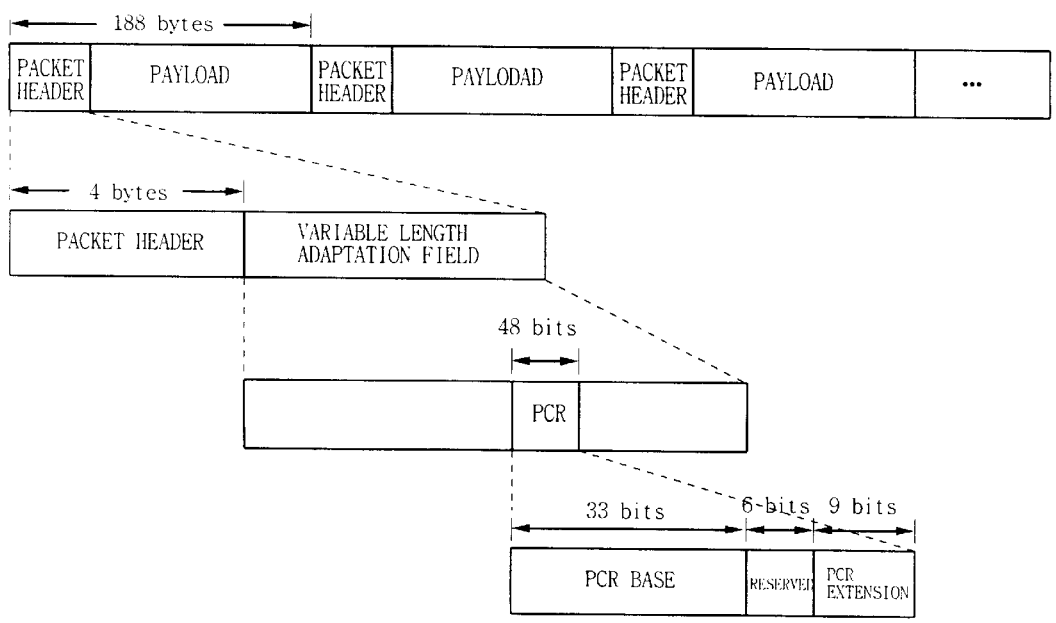
Figure 3:
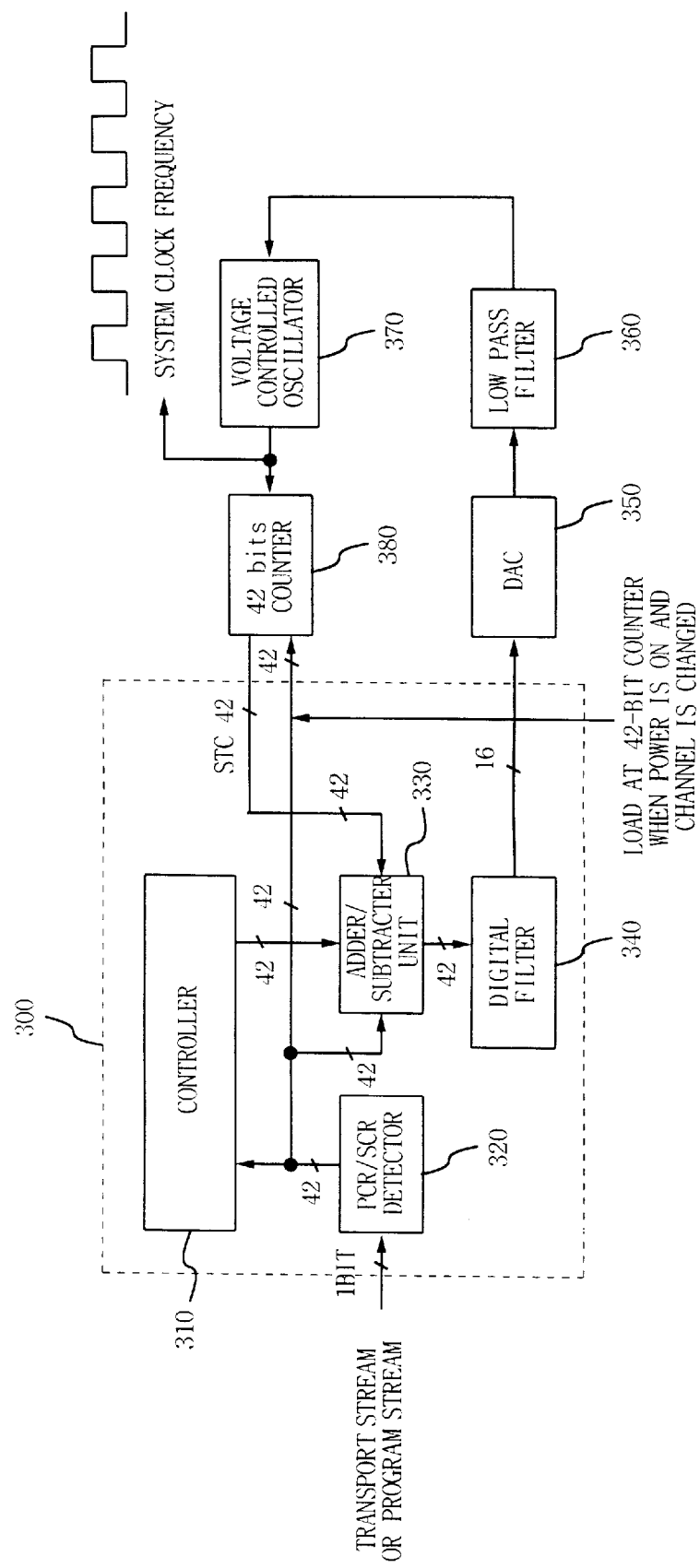
FIG. 3 is a block diagram of a conventional clock recovery circuit for an MPEG-2 system decoder.
Figure 4:
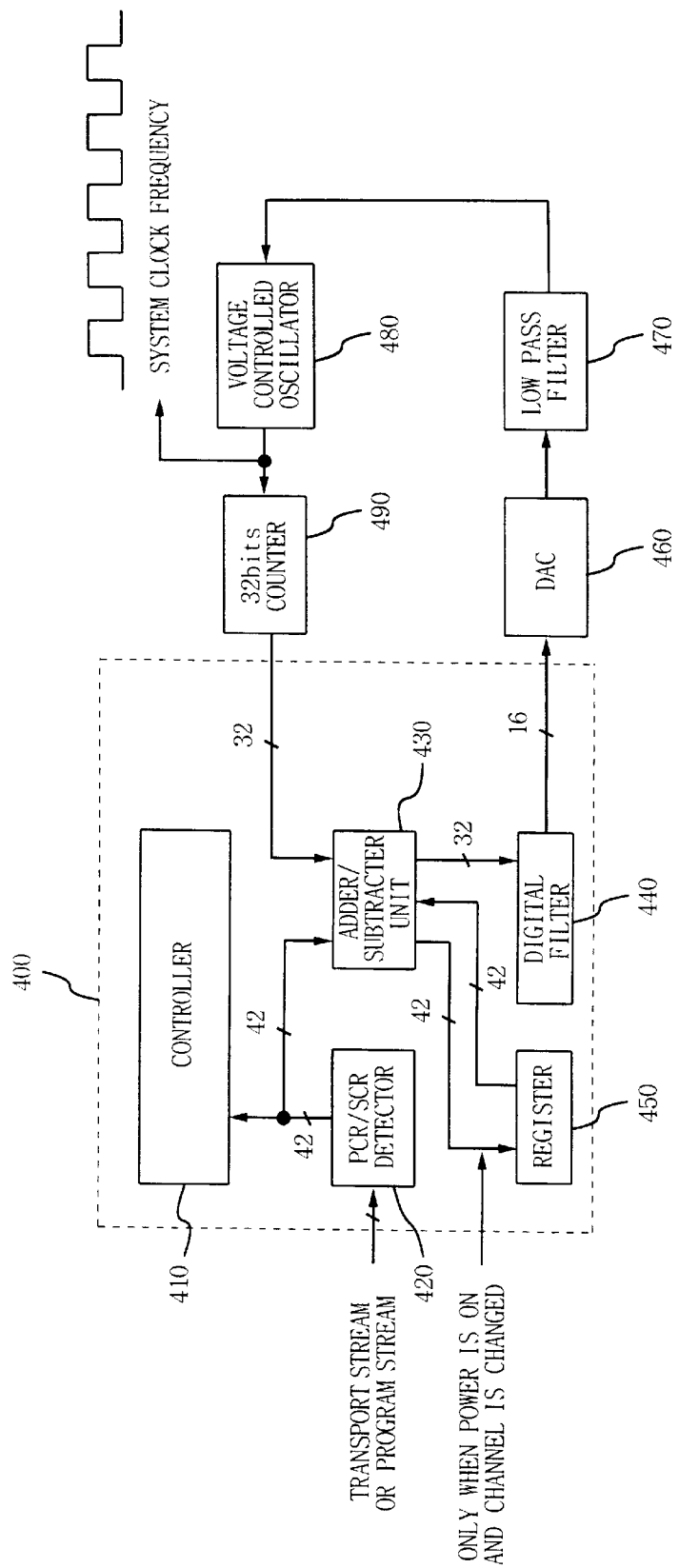
FIG. 4 is a block diagram of a clock recovery circuit for an MPEG-2 system decoder in accordance with the present invention.

FIG. 4 is a block diagram of a clock recovery circuit for an MPEG-2 system decoder in accordance with the present invention. As shown in this drawing, the clock recovery circuit comprises a digital signal processor 400 including a controller 410, a PCR/SCR detector 420, an adder/subtracter unit 430, a digital filter 440 and a register 450, a DAC 460, a low pass filter 470, a voltage controlled oscillator 480 and a 32-bit counter 490. The digital signal processor 400 of FIG. 4 is the same in construction as the digital signal processor 300 of FIG. 3, only with the exception that the controller 410 is different in software from the controller 310. The register 450 is not a new block for the implementation of the present invention but a block included generally in the digital signal processor. Therefore, as compared with the digital signal processor 300 of FIG. 3, the digital signal processor 400 performs a different operation according to different software with no further hardware. Further in FIG. 4, the 32-bit counter is used instead of the 42-bit counter, resulting in a reduction in hardware size.

FIG. 5 is a flowchart illustrating the operation of the digital signal processor 400 in FIG. 4 in accordance with an embodiment of the present invention. First, upon receiving a transport or program stream, the PCR/ISCR detector 420 detects a 42-bit PCR or SCR therefrom at step 500. The controller 410 checks at step 510 whether the PCR or SCR detected by the PCR/SCR detector 420 is an initial value. If the detected PCR or SCR is the initial value, the adder/subtracter unit 430 is operated under the control of the controller 410 at step 520 to subtract a 32-bit output value from the 32-bit counter 490 from the detected PCR or SCR starting from the least significant bit to generate a 42-bit first value. Then, the first value from the adder/subtracter unit 430 is stored in the register 450 at step 530. However, in the case where the detected PCR or SCR is not the initial value, the adder/subtracter unit 430 subtracts the lower-order 32 bit values of the first value stored in the register 450 from the lower-order 32 bit values of the detected PCR or SCR at step 540. Then, at step 550, the adder/subtracter unit 430 subtracts the output value from the 32-bit counter 490 from the result subtracted at the above step 540 to generate a second value. In case where a synchronization is being kept correctly, the second value of the result value at step 540, is "0". On the other hand, in case where the second value is not "0", since the synchronization is not being kept correctly, the voltage controlled oscillator 480 is operated by the difference thereof, thereby increasing or decreasing the speed of the system clock reference. The digital filter 440 digital-filters the second value from the adder/subtracter unit 430 at step 560 to generate a 16-bit digital value. Also, at step 570, the adder/subtracter unit 430 adds the 32-bit output value from the 32-bit counter 490 to the first value stored in the register 450 starting from the least significant bit to generate an STC.

The DAC 460 converts the digital value from the digital filter 440 into an analog value. The low pass filter 470 low pass filters the analog value from the DAC 460. The voltage controlled oscillator 480 generates a system clock which is varied in frequency according to an output value from the low pass filter 470. Namely, in the case where the second value from the adder/subtracter unit 430 is positive, it is signified that the system clock is low in frequency. In this case, the voltage controlled oscillator 480 generates the system clock at a higher frequency. However, in the case where the second value from the adder/subtracter unit 430 is negative, it is signified that the system clock is high in frequency. In this case, the voltage controlled oscillator 480 generates the system clock at a lower frequency. On the other hand, the 32-bit counter 490 performs a counting operation in response to the system clock from the voltage controlled oscillator 480. At this time, the 32-bit counter 490 generates the lower-order 9 bits by repeatedly counting from 0 to 299 and the higher-order 23 bits by counting up by one whenever counting from 0 to 299. Also, the 32-bit counter 490 is reset at an interval of about one minute and thirty seconds. As a result, the comparison of the STC with the lower-order 32 bit values of the PCR or SCR using the 32-bit counter 490 is sufficient for the clock recovery in consideration of input periods of the PCR and SCR.

Therefore, in the present clock recovery circuit and method for the MPEG-2 system decoder, there is no necessity for setting the counter to the initial PCR or SCR. Further, all of the 42 bit values of the PCR or SCR are not used but only the lower-order 32 bit values thereof are used for the clock recovery in consideration of the input periods of the PCR and SCR. As a result, a data access time can be reduced in the case where a 16-bit or 32-bit digital signal processor is used for the clock recovery.

Although the preferred embodiments of the present invention have been disclosed to perform the clock recovery using the lower-order 32 bit values of the 42-bit PCR or SCR, those skilled in the art will appreciate that the size of the counter can be further reduced in consideration of the input periods of the PCR and SCR.

As apparent from the above description, according to the present invention, the 32-bit counter is used to reduce the data access time. Further, there is no necessity for setting the counter to the initial PCR or SCR.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A clock recovery circuit for an MPEG-2 system decoder, comprising:
   a digital signal processor including:
      program clock reference (PCR)/system clock reference (SCR) detection means for receiving a transport or program stream and detecting a PCR or SCR from the received transport or program stream;
      addition/subtraction means for, if the PCR or SCR detected by said PCR/SCR detection means is an initial value, subtracting a clock value of a desired number of bits from the detected PCR or SCR starting from the least significant bit to generate a first value and, if the detected PCR or SCR is not the initial value, subtracting lower-order bit values of said first value corresponding to said desired number from lower-order bit values of the detected PCR or SCR corresponding to said desired number, subtracting said clock value from the subtracted result to generate a second value and adding said clock value to said first value starting from the least significant bit to generate a system time clock;

storage means for storing said first value from said addition/subtraction means therein; and control means for checking whether the PCR or SCR detected by said PCR/SCR detection means is the initial value and controlling operations of said means in accordance with the checked result;

digital/analog conversion means for converting said second value from said addition/subtraction means into an analog value;

filtering means for filtering an output value from said digital/analog conversion means;

a voltage controlled oscillator for generating a system clock which is varied in frequency according to an output value from said filtering means; and counting means for generating said clock value of said desired number of bits in response to said system clock from said voltage controlled oscillator in such a manner that it generates lower-order 9 bits of said clock value by repeatedly counting a desired range and the remaining higher-order bits of said clock value by counting by one whenever counting said desired range.

2. A clock recovery circuit for an MPEG-2 system decoder, as set forth in claim 1, wherein said digital signal processor further includes a digital filter for digital-filtering said second value from said addition/subtraction means and transferring the digital-filtered value to said digital/analog conversion means.

3. A clock recovery circuit for an MPEG-2 system decoder, as set forth in claim 1, wherein said desired number is determined in consideration of input periods of said PCR and SCR.

4. A clock recovery circuit for an MPEG-2 system decoder, as set forth in claim 1, wherein said desired number is 32.

5. A clock recovery circuit for an MPEG-2 system decoder, as set forth in claim 1, wherein said storage means includes a register.

6. A clock recovery circuit for an MPEG-2 system decoder, as set forth in claim 1, wherein said desired range is from 0 to 299.

7. A clock recovery method for an MPEG-2 system decoder, said decoder having digital/analog conversion means for converting an input digital signal into an analog signal, filtering means for filtering the analog signal from said digital/analog conversion means, a voltage controlled oscillator for generating a system clock which is varied in frequency according to an output signal from said filtering means, and counting means for generating a clock value of a desired number of bits in response to said system clock from said voltage controlled oscillator in such a manner that it generates lower-order 9 bits of said clock value by repeatedly counting a desired range and the remaining higher-order bits of said clock value by counting by one whenever counting said desired range, said method comprising the steps of:

(a) receiving a transport or program stream, detecting a program clock reference (PCR) or system clock reference (SCR) from the received transport or program stream and checking whether the detected PCR or SCR is an initial value;

(b) if the detected PCR or SCR is the initial value, subtracting said clock value from said counting means from the detected PCR or SCR starting from the least significant bit to generate a first value;

(c) if the detected PCR or SCR is not the initial value, subtracting lower-order bit values of said first value corresponding to said desired number from lower-order bit values of the detected PCR or SCR corresponding to said desired number, subtracting said clock value from said counting means from the subtracted result to generate a second value and transferring said second value to said digital/analog conversion means; and (d) adding said clock value from said counting means to said first value starting from the least significant bit to generate a system time clock.

8. A clock recovery method for an MPEG-2 system decoder, as set forth in claim 7, wherein said desired number is determined in consideration of input periods of said PCR and SCR.

9. A clock recovery method for an MPEG-2 system decoder, as set forth in claim 7, wherein said desired number is 32.

10. A clock recovery method for an MPEG-2 system decoder, as set forth in claim 7, wherein said first value is stored in a register.

11. A clock recovery method for an MPEG-2 system decoder, as set forth in claim 7, wherein said desired range is from 0 to 299.

12. A clock recovery circuit for an MPEG-2 system decoder, as set forth in claim 3, wherein said desired number is 32.

13. A clock recovery method for an MPEG-2 system decoder, as set forth in claim 8, wherein said desired number is 32.

* * * * *